United States Patent [19]

Kubo et al.

[11] Patent Number: 4,690,426
[45] Date of Patent: Sep. 1, 1987

[54] TRAILING ARM JOINT STRUCTURE

[75] Inventors: Kanji Kubo, Tokyo; Nobuyoshi Asanuma, Saitama; Kazuo Saito, Tokyo; Yasuhiko Yamamoto, Saitama, all of Japan

[73] Assignee: Honda Giken Kogyo Kabushiki Kaisha, Tokyo, Japan

[21] Appl. No.: 773,438

[22] Filed: Sep. 6, 1985

[30] Foreign Application Priority Data

Sep. 6, 1984 [JP] Japan .............. 59-135519[U]
Sep. 6, 1984 [JP] Japan .............. 59-135520[U]

[51] Int. Cl.⁴ .............................................. B60G 3/00
[52] U.S. Cl. .............:........................ 280/690; 280/701
[58] Field of Search .............. 280/690, 700, 701, 697; 180/73.3, 73.4

[56] References Cited

U.S. PATENT DOCUMENTS 3,205,967  9/1965  Stotz et al. .......................... 280/700

FOREIGN PATENT DOCUMENTS 83183    7/1983  European Pat. Off. ............ 280/701
1430802 12/1968  Fed. Rep. of Germany ...... 280/701
2038880  2/1972  Fed. Rep. of Germany ...... 280/701
698921  12/1965  Italy .................................... 280/701

Primary Examiner—John J. Love
Assistant Examiner—Ross Weaver
Attorney, Agent, or Firm—Irving M. Weiner; Joseph P. Carrier; Pamela S. Burt

[57] ABSTRACT

A trailing arm joint structure includes a knuckle for supporting a wheel and a substantially plate-like trailing arm lying in a vertical plane and having a front end adapted to be pivotally coupled to a vehicle frame and a rear end pivotally coupled to the knuckle. The knuckle has a front bifurcated portion composed of first upper and lower joint fingers extending forwardly and spaced vertically from each other, the knuckle having a link joint positioned between the first upper and lower joint fingers. The rear end of the trailing arm has a rear bifurcated portion composed of second upper and lower joint fingers extending rearwardly and spaced vertically from each other, the front and rear bifurcated portions being held against each other with said first and second upper and lower joint fingers being fastened together.

5 Claims, 6 Drawing Figures

TRAILING ARM JOINT STRUCTURE

BACKGROUND OF THE INVENTION

1. Field of the Invention

The present invention relates to a joint structure by which the trailing arm of an independent rear suspension is coupled to a knuckle in a motor vehicle such as an automobile.

This application is copending with related and commonly assigned U.S. patent application Ser. No. 653,644 filed Sept. 24, 1984. Note, however, that such application is directed to novel subject matter which is patentably distinct from the subject matter of the present application.

2. Discussion of Relevant Art

Japanese Laid-Open Patent Publication No. 60-67203, filed on Sept. 22, 1983 and published on Apr. 17, 1985, discloses an independent rear suspension composed of a trailing arm, an upper arm, lower arms, and a correcting link, the trailing arm being sufficiently resilient in the transverse direction of the vehicle frame and highly rigid in the vertical direction. The disclosed trailing arm is composed of a leaf spring and has a front end vertically pivotally coupled to the vehicle frame by a rubber bushing. The rear end of the trailing arm is fastened by bolts to a knuckle arm. A wheel is rotatably supported on a spindle projecting outwardly through the trailing arm. The upper and lower arms which extend inwardly of of the vehicle frame have outer ends coupled to the upper and lower ends of the knuckle arm.

Since the trailing arm is resilient transversely and rigid vertically, the amount of transverse movement of the rubber bushing on the front end of the trailing arm is reduced for reducing resistive forces against the vertical movement of the trailing arm, resulting in improved riding comfort and noise reduction.

Because the knuckle is coupled to the inner surface of the rear end of the trailing arm, however, the trailing arm is required to be of an elongate configuration including the portion which supports the entire back of the knuckle. As a consequence, the requirement for the trailing arm to be elongate in shape has posed certain limitations on efforts to reduce the weight and cost of the trailing arm. Furthermore, inasmuch as the lower arms are connected to the lower end of the knuckle, it has been tedious and time-consuming for the worker to join the lower arms to the knuckle, especially to install bushings between the lower arms and the knuckle. Additionally, if the buckling strength of the trailing arm which is subject to compressive and bending loads were to be increased by increasing the thickness thereof, the rigidity of the trailing arm compared to its ability to flex would also be increased to the point where the desired function of the leaf spring serving as the trailing arm would not be attained.

SUMMARY OF THE INVENTION

Accordingly, it is an object of the present invention to provide a trailing arm joint structure in an independent rear suspension composed of a trailing arm, an upper arm, lower arms, and a correcting link, the trailing arm being sufficiently resilient in the transverse direction of the vehicle frame and highly rigid in the vertical direction, wherein the joint structure allows the trailing arm to be reduced in overall length to make the trailing arm smaller in weight and cost.

Another object of the present invention is to provide a trailing arm joint structure which permits a lower arm to be easily coupled, by a tool inserted from outside of a trailing arm, to a knuckle that has been connected to the trailing arm, while allowing a bushing to be installed with ease, whereby a suspension can be assembled efficiently.

Still another object of the present invention is to provide a trailing arm in a suspension, which is shaped to have an increased buckling strength and at the same time a reduction in its rigidity compared to its flexibility.

According to the present invention, the above objects can be accomplished by a trailing arm joint structure including a knuckle for supporting a wheel, and a substantially plate-like trailing arm lying in a vertical plane and having a front end adapted to be pivotally coupled to a vehicle frame and a rear end pivotally coupled to the knuckle, the knuckle having a front bifurcated portion composed of first upper and lower joint fingers extending forwardly and spaced vertically from each other, the knuckle having a link joint positioned between the first upper and lower joint fingers, the rear end of the trailing arm having a rear bifurcated portion composed of second upper and lower joint fingers extending rearwardly and spaced vertically from each other, the front and rear bifurcated portions being held against each other with the first and second upper and lower joint fingers being fastened together.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
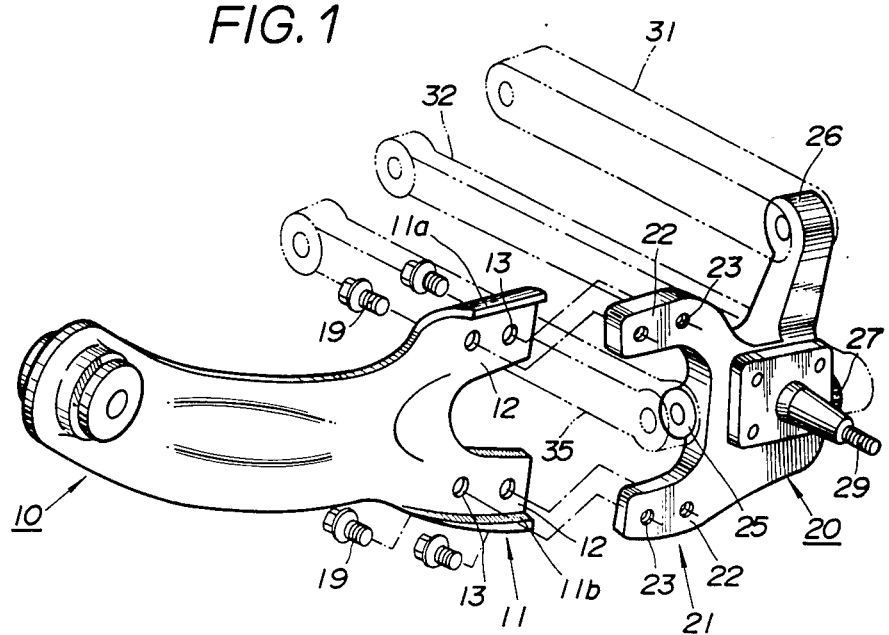
FIG. 1 is an exploded perspective view of a joint structure according to a first embodiment of the present invention, for coupling a trailing arm to a knuckle.
Figure 2:
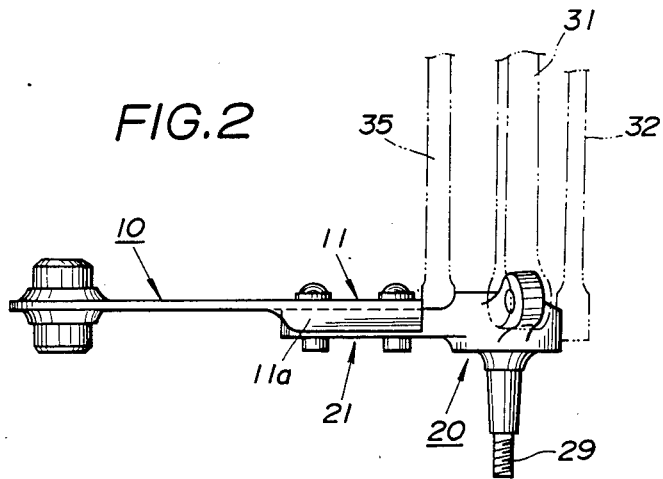
FIG. 2 is a plan view of the joint structure as it is put together.

As shown in FIGS. 1 and 2, a substantially plate-like trailing arm 10 comprising a leaf spring lying in a vertical plane includes a rear bifurcated portion 11 having upper and lower joint fingers 12, 12 spaced vertically from each other and extending rearwardly. The trailing arm 10 has a front end pivotally coupled to a vehicle frame (not shown). Each of the joint fingers 12 has two front and rear bolt holes 13, 13. The bifurcated portion 11 has upper and lower flanges 11a, 11b projecting outwardly from upper and lower edges of the joint fingers 12, 12, respectively.

A knuckle 20 has a spindle 29 projecting laterally therefrom for supporting a wheel (not shown) and includes a front bifurcated portion 21 composed of upper and lower joint fingers 22, 22 spaced vertically from each other and extending forwardly. Each of the joint fingers 22 has two front and rear internally threaded holes 23, 23.

The knuckle 20 also has a link joint 25 on its front surface intermediate between the joint fingers 22, 22, and link joints 26, 27 on its upper and rear surfaces.

In assembly, the front bifurcated portion 21 of the knuckle 20 is held against the outer surface of the rear bifurcated portion 11 of the trailing arm 10 and between the upper and lower flanges 11a, 11b thereof, and the joint fingers 12, 22 are fastened together by means of bolts 19 inserted through the bolt holes 13 threadedly into the holes 23 thereby to join the knuckle 20 to the rear end of the trailing arm 10.

Figure 3:
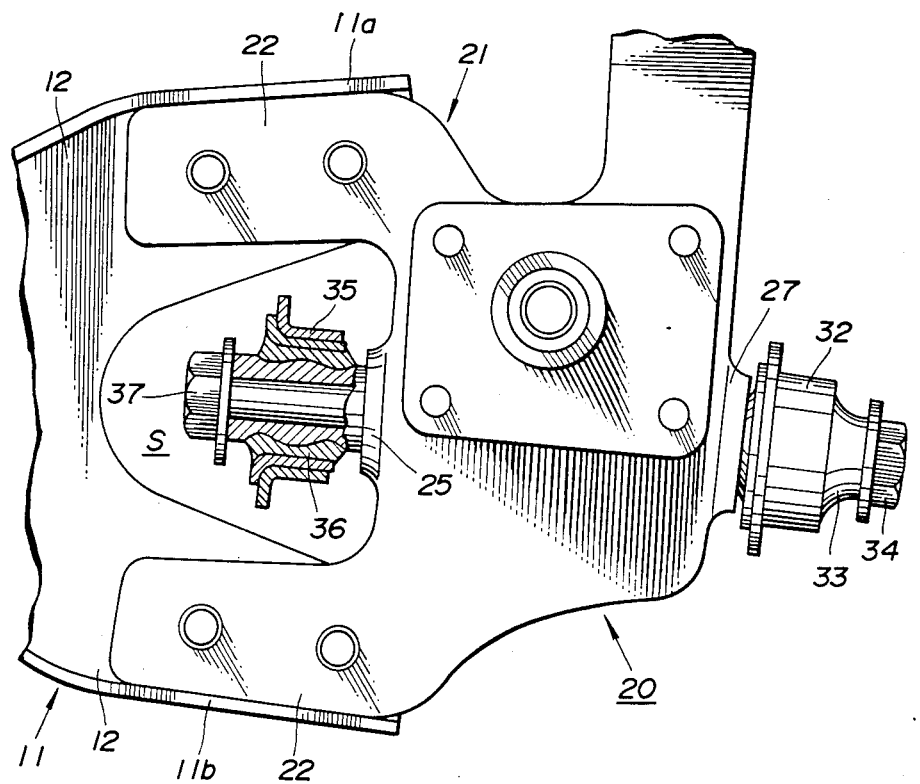
FIG. 3 is an enlarged fragmentary side elevational view of the joint structure.

An upper arm 31 is pivotally connected to the upper link joint 26 of the knuckle 20, and a lower arm 32 is pivotally connected to the rear link joint 27. Another lower arm 35 is pivotally coupled to the link joint 25 disposed between the joint fingers 22, 22. More specifically, as shown in FIG. 3, the lower arm 35 is coupled by a bolt 37 to the link joint 25 with a rubber bushing 36 interposed between the lower arm 35 and the bolt 37. Since the link joint 25 is positioned in a space S defined between the bifurcated portions 11, 21 which have been fastened to each other, the bolt 37 can easily be tightened by a fasteneing tool such as a wrench from outside of the trailing arm 10.

The lower arm 32 is coupled to the link joint 27 by a rubber bushing 33 and a bolt 34 as illustrated in FIG. 3.

The front end portion of the trailing arm 10, and the inner ends of the upper arm 31 and the lower arms 32, 35 are pivotally connected to the vehicle frame.

Since the trailing arm 10 and the knuckle 20 are interconnected through the bifurcated portions 11, 21 projecting in overlapping relation to each other, the entire length of the trailing arm 10 is shorter, by the longitudinal length of the knuckle 20, than conventional trailing arms. Therefore, the trailing arm 10 is reduced in weight and cost.

The link joint 25 for attachment of the lower arm 35 is located in the space S defined between the bifurcated portions 11, 21. Therefore, the lower arm 35 can easily be fastened to the knuckle 20 which has already been joined to the trailing arm 10 by the tool inserted from outside of the trailing arm 10, while installing the bushing 36 easily through the space.

Figure 4:
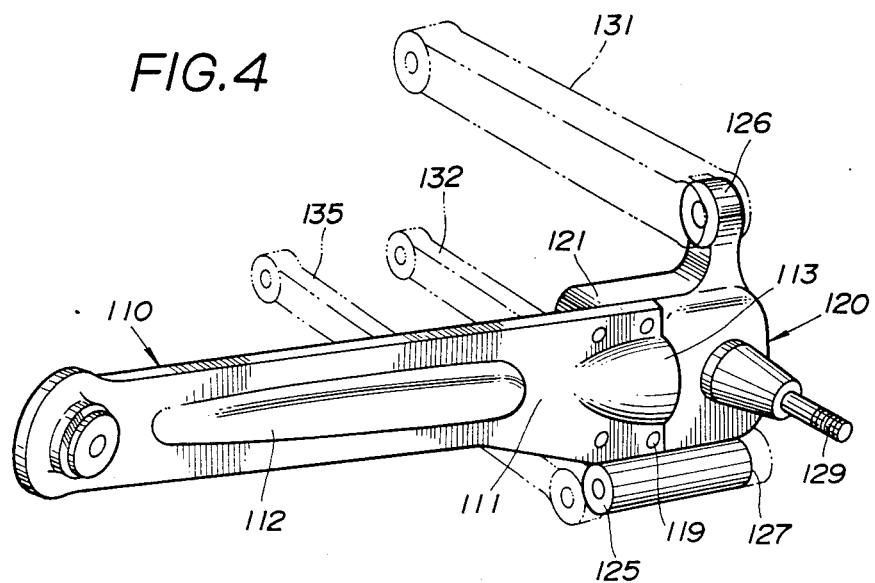
FIG. 4 is a perspective view of a joint structure according to a second embodiment of the present invention, the view showing a trailing arm and a knuckle coupled together.
Figure 5:
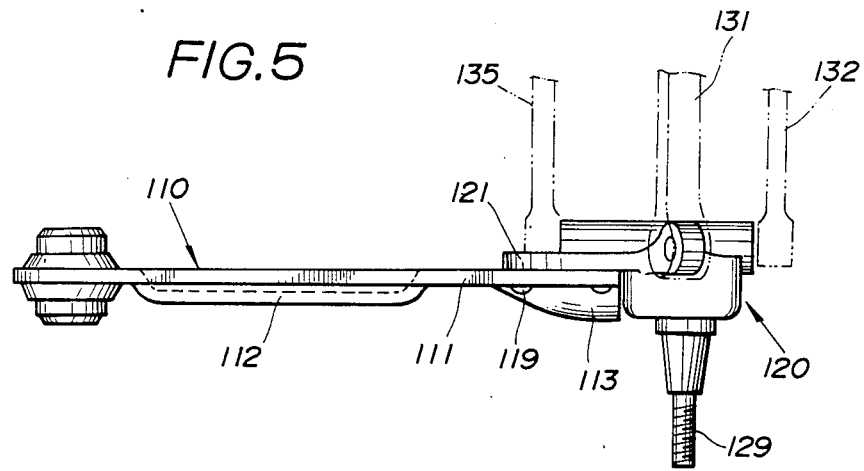
FIG. 5 is a plan view of the joint structure shown in FIG. 4.

FIGS. 4 and 5 illustrate a trailing arm joint structure according to a second embodiment of the present invention. A substantially plate-like trailing arm 110 in the form of a leaf spring lying in a vertical plane has longitudinally extending embossed portions 112, 113 spaced from each other and projecting outwardly with an intermediate non-embossed or flat portion 111 left therebetween which is located close to the rear end of the trailing arm 110. Therefore, the trailing arm 110 has an increased buckling strength and an increased rigidity compared to its flexibility at the embossed portions 112, 113. However, the flat portion 111 is sufficiently resilient and serves as a flexible portion.

A knuckle 120 has a spindle 129 projecting laterally therefrom for supporting a wheel and also an attachment 121 projecting forwardly from the front end thereof. In assembly, the attachment 121 is held against the inner surface of the rear end of the trailing arm 110, and is fastened to the rear end of the trailing arm 110 by means of four bolts 119 extending through the trailing arm 110 above and below the embossed portion 113 threadedly into the attachment 121.

The knuckle 120 has a link joint 125 on a lower front portion thereof, and link joints 126, 127 on upper and lower rear portions thereof. An upper arm 131 is pivotally coupled at an outer end thereof to the link joint 126. Lower arms 132, 135 are pivotally coupled at outer ends thereof to the link joints 127, 125, respectively.

Since the trailing arm 110 has the more-rigid embossed portions 112, 113 extending longitudinally of the trailing arm 110 with the flat portion 111 positioned therebetween, the trailing arm 110 has an increased buckling strength against compressive loads at the embossed portions 112, 113. The flat portion 111 between the embossed portions 112, 113 allows the trailing arm 110 to be sufficiently flexible transversely at the flat portion 111.

Inasmuch as the rear end of the trailing arm 110 is coupled to the attachment 121 on the front end of the knuckle 120, as with the first embodiment, the entire length of the trailing arm 110 is shorter, by the longitudinal length of the knuckle 120, than conventional trailing arms. As a consequence, the trailing arm 110 is reduced in weight and cost.

Figure 6:
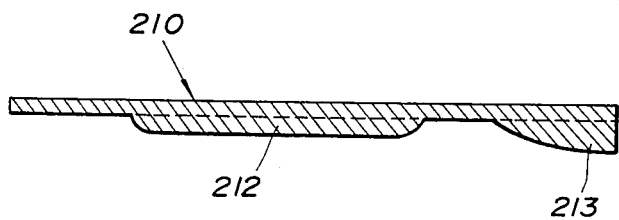
FIG. 6 is a cross-sectional view of a modified trailing arm.

As shown in FIG. 6, a trailing arm 210 may be reinforced for more rigidity with thicker ribs 212, 213 employed in place of the embossed portions 112, 113, respectively.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:

1. A trailing arm joint structure comprising:
   a knuckle for supporting a wheel;
   a substantially plate-like trailing arm lying in a vertical plane and having a front end adapted to be pivotally coupled to a vehicle frame and a rear end rigidly coupled to said knuckle;
   said knuckle having a front bifurcated portion composed of first upper and lower joint fingers extending forwardly and spaced vertically from each other, said knuckle having a link joint positioned between said first upper and lower joint fingers;
   said rear end of the trailing arm having a rear bifurcated portion composed of second upper and lower joint fingers extending rearwardly and spaced vertically from each other, said front and rear bifurcated portions being held against each other with said first and second upper and lower joint fingers being fastened together; and
   said trailing arm includes more-rigid portions which are longitudinally and horizontally separated by a less-rigid portion so that said trailing arm has an increased buckling strength at said more rigid portions, but is transversely flexible at said less rigid portion.

2. A trailing arm joint structure according to claim 1, wherein said front and rear bifurcated portions jointly define a space therebetween, said link joint being positioned in said space.

3. A trailing arm joint structure comprising:
a knuckle for supporting a wheel;
a substantially plate-like trailing arm lying in a vertical plane and having a front end adapted to be pivotally coupled to a vehicle frame and a rear end rigidly coupled to said knuckle;
said knuckle having an attachment projecting forwardly from a front end thereof, said rear end of the trailing arm being fastened to said attachment in overlapping relation thereto; and
said trailing arm comprising a leaf spring which extends longitudinally of said vehicle frame, said leaf spring including more-rigid portions which are longitudinally and horizontally separated by a less-rigid portion so that said trailing arm has an increased buckling strength at said more-rigid portions, but is transversely flexible at said less-rigid portion.

4. A trailing arm joint structure according to claim 3, wherein each of said more-rigid portion comprises an embossed portion.

5. A trailing arm joint structure according to claim 3, wherein each of said more-rigid portions comprises a thicker rib.

* * * * *